Jan. 7, 1941.  W. WADE  2,227,682

METHOD OF MAKING STRIPED PELLICLES

Filed Jan. 25, 1939

INVENTOR
WORTH WADE
BY John M. Leach
ATTORNEY

Patented Jan. 7, 1941

2,227,682

UNITED STATES PATENT OFFICE 2,227,682

METHOD OF MAKING STRIPED PELLICLES

Worth Wade, Scarsdale, N. Y., assignor to Sylvania Industrial Corporation, Fredericksburg, Va., a corporation of Virginia Application January 25, 1939, Serial No. 252,742

5 Claims. (Cl. 18—57)

This invention relates to a method of producing pellicles containing coloring matter formed in situ. More particularly, it relates to a method of extruding pellicles having contrasting sections, for example, extruding shrinkable closures for containers, such as caps and bands for containers of the type which carry an indicia-bearing label, for example, a Government tax stamp, over the cork or other closure, and to correlated improvements directed to enhancing the appearance of the same.

In the packaging of alcoholic liquors such as wines, whiskeys, etc., in bottles, it is the general practice to affix identifying labels and sometimes necessary to apply a Government tax stamp over or adjacent the mouth of the bottle. Such stamps are usually in the form of a narrow strip which is adhesively attached to the closure and extends over the top of the closure cap and down the sides of the bottle neck. The stamp must be affixed in such a manner that the whole of the stamp is visible and also so that the bottle cannot be opened and the contents removed without mutilating the stamp.

It is frequently the practice to place over the bottle closure an additional closure in the form of a shrinkable cap or band. To enhance the appearance of the closure, the cap or band is made or rendered opaque. When such an opaque cap or band is placed over the strip stamp to hold the same in place and to effectively seal the container, the cap or band will obscure a part of the stamp in violation of the Government regulations unless the cap or band is provided with a transparent section or sections through which the stamp will be visible at all times. It has been customary heretofore to extrude tubing for use in forming container closures through nozzles divided into sections. Colored plastic material was supplied to two opposite sections and transparent plastic material was supplied to the other sections. The alternate colored and transparent strips of plastic material were brought together and coagulated by passing them into a coagulating bath to form a continuous tubing having opposed transparent sections and opposed colored sections. This practice has made it necessary to change the entire batch of colored plastic material supplied to the nozzle each time a change in color of the finished container closures was desired, which is a frequent occurrence in view of the fact that many different colors are used. Such changes have added greatly to the expense of manufacture of container closures since the extruding machine must be shut down and cleaned at each change and a new batch of plastic material must be prepared.

It is a general object of the present invention to provide a method of producing pellicles containing colored matter formed in situ.

It is another general object of the present invention to provide a method of producing pellicles containing opaque and colored matter formed in situ.

It is another object of the invention to provide a method of producing pellicles from plastic materials and having sections which contrast in appearance.

It is a specific object of the invention to provide an improved method of producing shrinkable container closures of the cap or band type which include transparent sections so that when a cap or band is properly applied over a container mouth having an indicia-bearing label adjacent thereto or thereon, the label will be clearly legible in its entirety.

Another object of the invention is to provide a method of producing a tubing capable of use as a container closure which has transparent colored or colorless and transparent colored or opaque colored sections extending longitudinally of the tubing.

A further object of the invention is to provide a method of producing tubing capable of use as a container closure having longitudinally extending colored sections in which the coloration may be economically and efficaciously applied.

Other objects of the invention will in part be obvious and will in part appear hereinafter.

According to the present invention, a pellicle is formed by extruding a plastic material or materials into a coagulant, the plastic material or certain sections thereof containing a substance which will react with the coagulant or with a substance contained in the coagulant to produce a definite color and/or opacity in all of the pellicle or in one or more of said sections thereof. The article produced in accordance with the now preferred embodiment of the invention comprises a pellicle having a plurality of longitudinal sections, at least some of which are impregnated with an insoluble colored and/or opaque compound and other sections which are transparent and substantially free of such compound, whereby the pellicle, when in the form of a tubing, is adapted to serve as a container closure and when properly applied over a container mouth having an indicia bearing label thereon will render the label clearly legible through one or more of the transparent sections.

The invention accordingly comprises a process having the several steps and the relation of one or more of such steps with respect to each of the others, which will be exemplified in the following detailed description, and the scope of the invention will be indicated in the claims.

For a more complete understanding of the nature and objects of the invention, reference should be had to the accompanying drawing in which.

Figure 1:
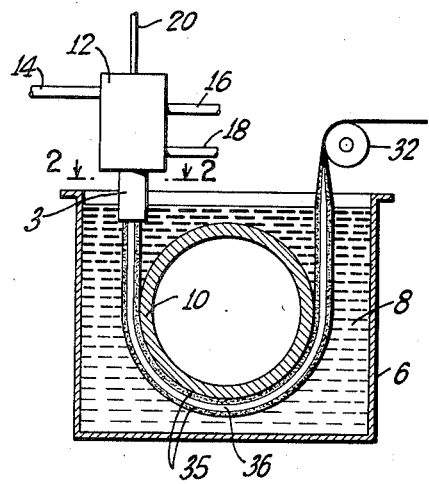
Fig. 1 is a diagrammatical view of one form of apparatus by which the method of the present invention may be carried out.

By way of explanation, but not in limitation of the invention, it will be described in connection with the formation of container closures, but it is to be understood that it is equally as applicable to the formation of sheets, ribbons and other pellicles.

In general, the method of the present invention comprises extruding suitable plastic material through an annular nozzle which is divided into two or more, preferably four, extruding sections. This type of nozzle is generally of known design and the nozzle has, therefore, been illustrated only in sufficient detail to disclose the novel features. The plastic material which is supplied to certain of these extruding sections contains a reagent which is acted upon by the coagulating solution into which it is extruded to form colored sections which are more or less opaque. For this purpose, the plastic material which is supplied to certain of the extruding sections, for example, to every other section, has added to it prior to extrusion, a substance which will react with the coagulating liquid or with a second substance contained within the coagulating liquid to precipitate a colored and opaque insoluble inorganic compound within the pellicle. There is shown in the drawing one embodiment of a suitable apparatus for carrying out the process of the invention.

In Fig. 1 of the drawing, the tank 6 is adapted to contain a coagulating solution or liquid 8. A roller 10 is suitably mounted for rotation within the tank. An extrusion nozzle 12 is disposed above the tank and extends within the tank below the upper level of the coagulating liquid 8 so that the plastic material is extruded tangential to the surface of the roller 10. The annular nozzle 12 is provided with supply pipes 14 and 16 for the plastic material, a pipe 18 for supplying coagulating liquid to the interior of the extruded tubing, which coagulant is the same as or similar to the liquid 8, and a pipe 20 through which air may be delivered to the interior of the extruded tubing for the purpose of maintaining it in a distended or expanded condition.

Figure 2:
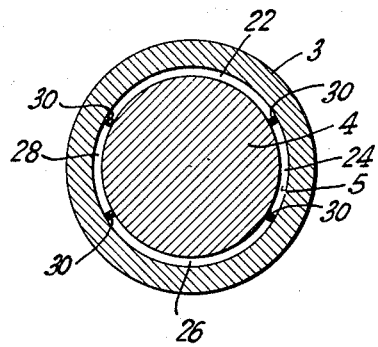
Fig. 2 is a cross-sectional view of the nozzle of the apparatus and is taken substantially on the plane indicated by the line 2—2 of Fig. 1.

The annular nozzle 12 comprises a tube 3 having a central core 4 which together define the orifice 5. The orifice 5 is divided into extruding sections 22, 24, 26 and 28 by suitable dividing members 30, as shown in Fig. 2. The number of these sections may be increased or decreased as desired and the sections may be equal quadrants or two opposed sections may be of equal size but greater dimensions than the remaining sections.

The plastic material supplied to the nozzle from pipe 14 is delivered to certain of these extruding sections, for example, 22 and 26, and the plastic material supplied to the nozzle by pipe 16 to others of these extruding sections, for example, 24 and 28. It is to be understood, however, that the plastic material supplied by either pipe may be delivered to only one of the extruding sections if only a single colored section is desired, or any number of the sections may be supplied by either pipe, depending on the arrangement of the differently colored sections desired. Also, the same plastic material may be supplied to all of the sections, or a nozzle which is not divided into sections may be used if a tubing which is uniformly colored throughout is desired.

During or just prior to the extrusion of the plastic material from the nozzle 12, the extruded sections come together and coalesce or otherwise firmly weld to each other. As the sectional tubing passes into the coagulating solution, the material is coagulated and hardened sufficiently to be self-supporting. The tubing passes around roller 10 and out of the tank over a guide roller 32 and proceeds to further treatment to purify, wash and condition the tubing in any known and desired manner. After treating, the tubing is cut transversely into short bands, such as that shown at 34 in Fig. 3, to form container closures or other articles, or is in condition for such other use as might be desired.

The plastic material which is supplied to the nozzle 12 may be viscose, a solution of cellulose in organic or inorganic solvents, or a cellulose alkyl ether, a cellulose hydroxy-alkyl ether, a cellulose ester, such, for example, as cellulose acetate or cellulose nitrate, casein, gelatin, or a resin such, for example, as a phenol-formaldehyde resin, a urea-formaldehyde resin, a vinyl resin and like film-forming plastic materials, all of which may be dissolved in suitable known solvents and coagulated in suitable known liquid coagulants as well known in the art.

The plastic material which is delivered to those extruding sections which are to form the colored and/or opaque sections of the tubing has added to it, before extrusion, an inorganic substance which will react with the coagulant, or with an inorganic substance contained within the coagulating liquid, to produce a definite color and/or opacity in these sections. The concentration of the first substance in the plastic material may be varied to produce any degree of opacity in the finished tubing desired. If desired, a pigment such as titanium dioxide may be added to the plastic material supplied to the extruding sections of the nozzle which are to form opaque tubing sections in addition to the color-forming substance.

Plastic material which is free or substantially free of a color-forming substance is supplied to the nozzle sections which are to form the transparent and colorless sections in the tubing.

In order to insure that the line of demarcation between the contrasting sections will be sharp and well defined, a substance may be added to the plastic material supplied to certain nozzle sections which will react with a substance in the plastic material supplied to adjacent nozzle sections to form a colored and/or opaque deposit at the line of contact between adjacent pellicle sections when the same come together at the extrusion nozzle. The substance applied to the plastic material supplied to the first named nozzle sections may be the same as that used in the coagulating bath, in which case the deposit along the line of demarcation between the pellicle sections will be the same as that formed throughout the pellicle sections extruded from the second named nozzle sections. If desired, the substance applied to the plastic material supplied to the first named nozzle sections may be different from that used in the coagulation bath so as to produce a line of demarcation having a different color or degree of opacity than the deposit formed throughout the adjacent pellicle sections.

It will be seen that the present invention provides a method of forming a pellicle which is either uniformly colored and more or less opaque throughout, or which comprises transparent colorless sections and colored opaque sections; or which comprises transparent colored sections and colored opaque sections, any combination of which sections may have lines of demarcation contrasting in color with the colors of the sections.

By way of explanation of the invention, but not in limitation thereof, the following examples of various treatments falling within the scope of this invention will be given:

*Example 1.*—When the plastic material is a cellulose ester, for example, cellulose acetate, basic lead acetate may be dissolved in a suitable solvent, for example, alcohol and added to the cellulose acetate dissolved in a suitable solvent, for example, acetone, and an aqueous solution of sodium sulphide used as the coagulating bath for the cellulose acetate and to react with the basic lead acetate to form a black precipitate of lead sulphide within the pellicle.

*Example 2.*—A cellulose acetate solution containing basic lead acetate is supplied to certain sections of an extruding head and a cellulose acetate solution which does not contain basic lead acetate is supplied to other adjacent sections of the extruding head, the solution being caused to flow with their edges in contact just prior to extrusion through a common orifice into a common coagulant such as water containing sodium sulphide, the sections which do not contain basic lead acetate will be merely coagulated, while those sections which do contain basic lead acetate will be coagulated and the basic lead acetate will react with the sodium sulphide to form a black lead sulphide precipitate within those sections. The result is a self-sustaining pellicle having both transparent colorless sections and black opaque sections.

*Example 3.*—In Example 2 a solution of ammonium sulphide in alcohol may be added to the cellulose acetate solution which does not contain basic lead acetate. When the latter solution comes in contact with the other cellulose solution containing lead acetate just prior to extrusion through the common orifice a black precipitate of lead sulphide will be found between the sections formed by the two solutions and sharply define the same.

*Example 4.*—In Example 3 instead of ammonium sulphide, ammonium chromate may be added to the first named cellulose acetate solution to react with the lead acetate in the cellulose acetate solution extruded from an adjacent section to precipitate lead chromate to form a yellow stripe at the boundary between the sections.

*Example 5.*—In Example 1, instead of the sodium sulphide used in the coagulating bath an aqueous solution of potassium di-chromate is employed as the coagulating liquid, the di-chromate reacting with the basic lead acetate to form a yellow precipitate of lead chromate within the pellicle.

*Example 6.*—If it is again desirable to change the color of the pellicle or any sections thereof as produced in Example 1, an aqueous solution of sulphuric acid may be used as the coagulating liquid and to react with the basic lead acetate to form a white precipitate of lead sulphate within any desired portions of the pellicle.

With respect to the above examples, other reagents may be selected as desired to react with the basic lead acetate and to coagulate the cellulose acetate or be used in connection with some other coagulant for the cellulose acetate to produce other desired colors throughout or in selected portions of the pellicle.

*Example 7.*—When viscose is used as the plastic material, sodium di-chromate may be added to the viscose before it is supplied to the extruding head and the coagulating liquid may consist of or include lead acetate and acetic acid whereby the viscose is coagulated and orange lead chromate formed in situ. Other reagents may be used as a coagulating agent for the viscose, or in connection with a selected coagulating agent for the viscose, to react with the sodium di-chromate in the viscose to produce other desired colorations within any selected portion of the pellicle.

*Example 8.*—In place of the sodium di-chromate of Example 7, barium chloride may be added to the viscose and ammonium sulphate used as one desired coagulating liquid.

*Example 9.*—When a cellulose ether, for example, a methyl or ethyl cellulose which is soluble in aqueous alkali solutions is used as a plastic material, barium hydroxide may be added to the ether solution supplied to the extruding head and sulphuric acid may be used as the coagulating liquid and as the reagent to produce a white precipitate within the pellicle.

*Example 10.*—Alternatively, to the barium hydroxide of Example 9 potassium di-chromate may be added to the cellulose ether solution, such solution being extruded as a pellicle into a coagulant comprising a solution of acetic acid and lead acetate used as one desired coagulating agent.

*Example 11.*—A plurality of streams of an alkali solution of a cellulose ether are passed through adjacent sections of a divided extrusion head, at least one of the streams containing sodium sulphide in solution. The edges of the several streams are brought together just prior to extrusion and then extruded through a common annular orifice, into a coagulant comprising a solution of acetic acid and lead acetate to produce a tubing having some transparent longitudinal sections and other sections rendered black and opaque by the production of black lead sulphide within such sections.

*Example 12.*—The film-forming materials and the color-forming materials may be the same as those given in Example 1 and a pigment, such as titanium dioxide, is added to the cellulosic material which is to be supplied to the sections of the extrusion head which are to form the colored opaque sections.

It can be seen from the foregoing examples that the solution of plastic material has the reagent which reacts with another substance to opacify and/or color the pellicle dissolved therein, either in solution in the plastic material solvent or in solution in a different solvent which is added to the plastic material.

Figure 3:
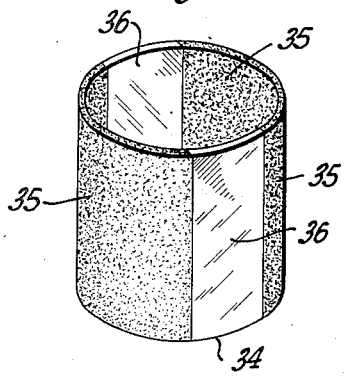
Fig. 3 is a perspective view of one embodiment of the closure formed in accordance with the method of the present invention.
Figure 4:
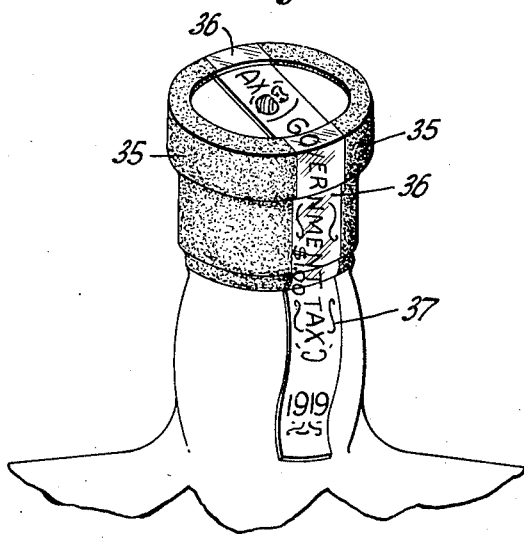
Fig. 4 is a perspective view of a container bearing a revenue stamp and the closure shown in Fig. 3.

The coagulated pellicle made according to any of the preceding examples may be purified, washed, softened, dried and otherwise finished as desired having regard for the particular film-forming material. When the pellicle is in the form of a tubing it may be cut transversely at suitable intervals to form a closure band 34 for containers as shown in Fig. 3. The tubing or band comprises two opposed longitudinal sections 35 which are rendered opaque and colored by the insoluble deposit formed in situ, such sections being separated by transparent, colorless sections 36. When the band 34 is disposed over the mouth of a bottle 37 having a tax stamp 38 sealed over the mouth as shown in Fig. 4, the transparent colorless sections 36 may be placed over the stamp so that the reading matter may be legible through the transparent sections.

If desired, one film-forming plastic material may be supplied to some of the extruding head sections and a different plastic material supplied to other sections, and a common coagulant for the two materials may be used. In such instances, there is produced a tubing having longitudinal sections, one or more of the sections being formed of one plastic material, and other sections formed of another plastic material, either of which materials may be rendered colored and/or opaque as above described. For example, viscose may be supplied to certain sections and an alkali solution of ethyl cellulose supplied to another section and an aqueous solution of sulphuric acid used as a common coagulant, suitable color forming reagents being added to either solution.

The several sections may be unequal in thickness, in fact, the opaque sections are preferably thicker to increase the depth of opacity and increase their strength.

It is to be understood that since the pigment is formed when the reagent in the coagulating bath diffuses into the gel pellicle, the precipitate is more dense adjacent the surfaces and less dense in the center of the pellicle. When producing tubes, the coagulant supplied to either the interior or to the exterior need not contain any reagent capable of forming a precipitate with the reagent contained in the gel pellicle.

Following the general principles of the invention herein described and exemplified, those skilled in the art may select suitable solvents, coagulants, and opaquing or color-forming reagents for any suitable plastic material without transcending the scope of the invention.

The present invention provides an improved method of forming colored pellicles in a rapid and inexpensive manner. The coloration of the pellicles may be rapidly changed without doing more than substituting one coagulating liquid for another without disturbing the extruding machine or the material supplied to it.

The present invention also provides an improved method of forming shrinkable container closures which may be applied over the neck of a bottle containing a tax stamp, while in a wet condition, and allowed to dry whereby they shrink tightly over the stamp and the neck of the bottle to provide an attractive and tamperproof seal. The revenue or similar stamp is completely visible through the transparent sections of the closure member and the other sections of the closure member may be left blank or may have printed matter added thereto as desired. The closure members which have opaque colored sections formed therein in accordance with the present invention provide an effective base for carrying printed matter, since the colored opaque material forms an attractive background which contrasts with the printing.

Throughout this specification and the appended claims the term "color" is to be interpreted as including black and white, and the term "insoluble" means insoluble in the coagulant or subsequent treating liquids.

Since certain changes in carrying out the above process may be made without departing from its scope, it is intended that all matter contained in the above description or shown in the accompanying drawing shall be interpreted as illustrative and not in a limiting sense.

What is claimed is:

1. A method of forming a pellicle having a plurality of sections, comprising passing a plurality of streams of plastic material through adjacent sections of a common extrusion head, one of the streams containing a substance capable of reacting with another substance to form a colored compound, and an adjacent stream containing said other substance, bringing the edges of the several streams together just prior to extrusion whereby the color-forming substances of said adjacent streams react to produce a color stripe between the adjacent streams, and extruding the plurality of streams.

2. The method of forming shrinkable container closures having longitudinal opaque areas and longitudinal transparent areas comprising passing a solution of a coagulable plastic material, containing an opaquing agent consisting of an inorganic substance dissolved in said solution and capable of reacting with a second substance to form an opaque, inorganic compound, through selected sections of an extrusion head having a plurality of separate sections, passing a coagulable plastic material which does not contain said opaquing agent through the remaining sections of said extrusion head, bringing said plastic materials together just prior to extrusion and extruding said materials through a common orifice of said extrusion head in the form of a tubing and into a bath which coagulates the said plastic materials and reacts with said inorganic substance to precipitate within the body of said tubing an opaque deposit of an inorganic compound, and severing said tubing transversely into short sections.

3. The method of forming shrinkable container closures having longitudinal opaque areas and longitudinal transparent areas comprising passing a solution of cellulose acetate containing an inorganic substance dissolved in said solution and capable of reacting with a second substance to form an opaque, inorganic compound, through selected sections of an extrusion head having a plurality of separate sections, passing a solution of cellulose acetate which does not contain said opaquing agent through the remaining sections of said extrusion head, bringing said solutions together just prior to extrusion and extruding said solutions through a common orifice of said extrusion head in the form of a tubing and into a bath which coagulates the cellulose acetate and reacts with said inorganic substance to precipitate within the body of said tubing an opaque deposit of an inorganic compound, and severing said tubing transversely into short sections.

4. The method of forming shrinkable container closures having longitudinal opaque areas and longitudinal transparent areas comprising passing a solution of alkali soluble cellulose ether through selected sections of an extrusion head having a plurality of separate sections, passing a viscose solution through the remaining sections of said extrusion head, one of said solutions containing an opaquing agent consisting of an inorganic substance dissolved in said solution and capable of reacting with a second substance to form an opaque, inorganic compound, bringing said solutions together just prior to extrusion and extruding said solutions through a common orifice of said extrusion head in the form of a tubing and into a bath which coagulates the alkali soluble cellulose ether and said viscose and reacts with said inorganic substance to precipitate within the portion of the body of said tubing formed by the solution containing said inorganic substance an opaque deposit of inorganic compound, and severing said tubing transversely into short sections.

5. A method of producing a colored pellicle, comprising continuously shaping into the form of a pellicle a coagulable plastic material containing an inorganic substance which is capable of reacting with other substances to produce differently colored inorganic compounds, treating a first portion of said plastic pellicle as it is being formed with one coagulating fluid which coagulates the plastic material and reacts with said inorganic substance to produce the desired colored insoluble inorganic compound within said pellicle, and treating subsequent portions of said pellicle by replacing said coagulating fluid with a different coagulating fluid which reacts with the inorganic substance to produce a different desired color, whereby the color of the pellicle is changed without changing the coagulable plastic material.

WORTH WADE.